July 31, 1962  R. C. MORTON  3,047,773

AUTOMATIC LIGHT CONTROL FOR INCANDESCENT LAMPS

Filed Feb. 10, 1960

INVENTOR.
ROBERT C. MORTON

BY Albert Rosen

ATTORNEY

United States Patent Office 3,047,773
Patented July 31, 1962

3,047,773
AUTOMATIC LIGHT CONTROL FOR
INCANDESCENT LAMPS
Robert C. Morton, Inglewood, Calif., assignor to California Computer Products, Inc., Downey, Calif., a corporation of California
Filed Feb. 10, 1960, Ser. No. 7,926
13 Claims. (Cl. 315—205)

This invention relates to an automatic incandescent lamp switching arrangement useful in controlling light displays of the kind wherein periodic changes in illumination are used to attract attention.

One of the more important objects of this invention is to provide three uniquely different changes in the illumination level of an incandescent lamp, as distinguished from the single change in illumination level provided by the conventional on-off flasher, for more readily attracting the human eye to the flashing arrangement.

Another object of this invention is the provision of an automatic and periodic incandescent lamp switching arrangement for displaying incandescent lamps in an attention gathering manner by effecting an illumination of the lamp at different illumination levels while switching the lamp between on and off conditions.

The foregoing and related objects are realized by connecting an incandescent lamp to an alternating current source through a switching arrangement according to the invention. The switching arrangement includes an automatic and periodic switching means for connecting the lamp directly to the alternating current source during one time interval, for providing a "full-tone" illumination of the lamp during this time interval, connecting a half-wave rectifier between the source and the lamp during a different time interval, for effecting a reduced or "half-tone" illumination of the lamp during the different time interval, and for completely interrupting the flow of current between the source and lamp during a further time interval. Since the arrangement of the invention provides three distinct and uniquely different kinds of changes in illumination level, namely a change in level between full-tone and half-tone lamp conditions, between off and full-tone conditions, and between off and half-tone conditions, an appreciably more striking light display arrangement is provided over that common to the more conventional on-off flashing displays where a single kind of illumination level change is effected.

In one embodiment the arrangement of the invention takes the form of an elongated bi-metallic switching element and a half-wave rectifier connected in a circuit between an incandescent lamp and an alternating current source. Current flow from the source is used to heat the bi-metallic element so as to effect automatic and periodic switching of the element from a first position, passing alternating current to the lamp, to a second position, wherein substantially no current is passed to the lamp, and then to a third position, wherein the rectifier is connected in electrical series between the source and the lamp. Thus, the bi-metallic element periodically effects a full-tone illumination of the lamp during direct connection of the lamp to the alternating current source, an off condition of the lamp during interruption of current flow to the lamp, and a half-tone illumination level during energization of the lamp through the half-wave rectifier. The term "periodically" is used broadly to refer to changes in switching effected at different times, but not necessarily over regularly repeating cycles. However, in order to be more accurate in referring to the switching cycles in this embodiment where bimetallic switching means are used, the switching is referred to as an "aperiodic switching." Since the human eye is more readily attracted by a change in illumination level then by steady illumination, the switching arrangement of the invention provides a greater amount of change than is the case in the more conventional attention gathering switching arrangements where an incandescent lamp is switched between on and off positions only. Another advantage of the arrangement of the invention is that the use of a half-wave rectifier for providing the reduced illumination level is free from the generation of appreciable heat; thus the full-tone, half-tone arrangement finds use in residences, for example, in providing an improved twinkling of Christmas tree lighting effects.

A discussion of half-wave rectifier incandescent lamp control, and the advantages of such control over the use of resistive, inductive, and capacitive arrangements, are provided in U.S. Patent 2,896,125 and U.S. Patent 3,009,071.

In the appended single sheet of drawing, wherein like reference characters refer to like parts:

As is known, the human eye is more readily attracted by a change in illumination level than by even a relatively bright but steady illumination. Thus, for example, advertising signs make extensive use of light flashing arrangements, where the alternate on and off conditions of lamps are relied upon to provide the attraction. Similarly, in residential Christmas tree displays, while different colored lamps are extensively used to provide an attractive display, extensive use is made of flashing arrangements for turning the lamps on and off so to provide an even more eye catching arrangement. According to the invention, the attraction of such displays is even further enhanced by not only changing the illumination of incandescent lamps between off and on conditions, but also by varying the illumination level during the on condition so as to provide an even greater variety of change in illumination conditions.

Figure 1:
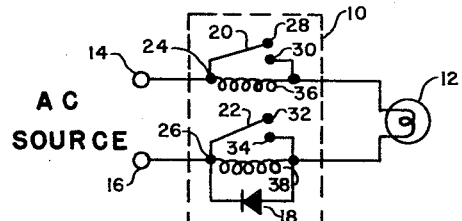
FIGURE 1 is a schematic illustration of an incandescent lamp flashing arrangement useful in automatically and aperiodically providing off, full-tone, and half-tone lamp flashing.
Figure 2:
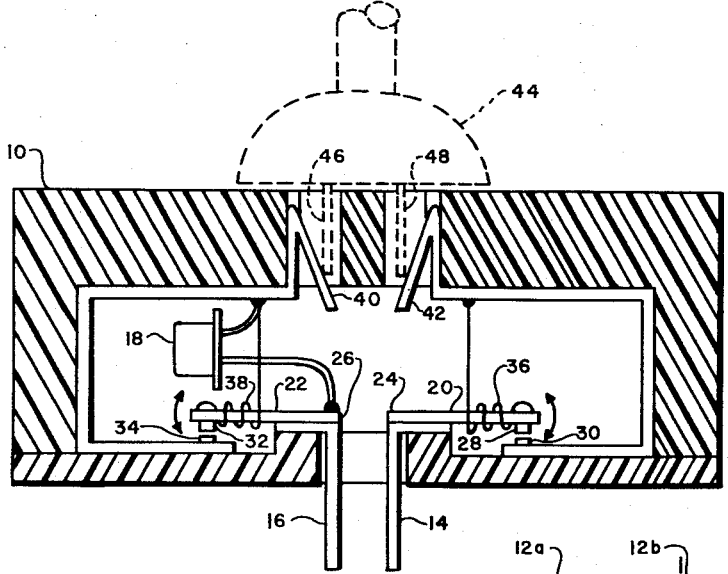
FIGURE 2 is a sectional view of apparatus embodying the schematic arrangement illustrated in FIGURE 1.

One such arrangement, useful in connection with residential type Christmas tree lamp displays, is depicted in FIGURES 1 and 2. In the schematic view of FIGURE 1 the lamp control arrangement is outlined within the dashed lined portion 10. The incandescent lamp 12 to be controlled by the control arrangement 10 is connected through the lamp control arrangement 10, to a set of alternating current source terminals 14 and 16. The lamp control arrangement 10 operates to aperiodically connect the lamp 12 directly to the terminals 14 and 16 during one time interval, to substantially completely interrupt all current flow between the lamp 12 and the terminals 14 and 16 during a different time interval, and to connect a half-wave rectifier 18 in series with the lamp 12 during yet another time interval. Thus the lamp 12 displays at these different respective time intervals, a full-tone illumination level, an off condition, and a half-tone or dim illumination level. The difference in illumination level between the half-tone and full-tone illumination level is as striking to the human eye as the difference in illumination level between either the change from off to full-tone illumination or off to half-tone illumination. Consequently, this arrangement of the invention provides three different illumination intensity level changes as distinguished from the single intensity level change provided by the more conventional on-off flashing arrangement.

The lamp control arrangement 10 of FIGURES 1 and 2 includes two elongated bi-metallic elements 20 and 22. Each of the two elements 20 and 22 is fixed at one end thereof, at ends 24 and 26, respectively. Each of these bi-metallic elements 20 and 22 is movable, as a function of their temperature, to control the making or breaking of a pair of contacts 28 and 30, and 32 and 34, respectively. Each bi-metallic element 20 and 22 is serially connected between one of the alternating current source terminals 14 or 16 and the incandescent lamp 12. The half-wave rectifier 18 is connected to effectively electrically bridge the pair of contacts 32 and 34 of the second bi-metallic element 22.

Two relatively high resistance heating coils 36 and 38 are each positioned in heating adjacency to a respective bi-metallic element 20 and 22. Each of the heating coils 36 and 38 has an electrical resistance that is high compared to the expected lamp resistance, for example, the coils may each have a resistance of the order of 5,000 ohms. Each of the coils 36 and 38 are electrically connected to bridge the electrical circuit between the contacts 28 and 30, and 32 and 34, of its respective bi-metallic element.

In operation, the bi-metallic elements 20 and 22, are normally open, in the positions depicted in FIGURES 1 and 2. At one given instant of time electric current flows into the lamp control arrangement 10 through one terminal 14, and through the first heating coil 36, then through the lamp 12, then through the diode 18 and the second heating coil 38 (a greater portion of the current flows through the diode 18 than the coil 38 since the diode has its conduction characteristics in this direction), and finally back to the alternating current source through the other terminal 16. Since the first heating coil 36 provides a relatively high electrical resistance, only a relatively small amount of current flows through lamp 12. Consequently, the lamp 12 is not effectively energized or illuminated. During a successive instant of time, current from the alternating current source flows in through the second terminal 16, through the second heating coil 38 (current cannot flow through the diode 18 in this reverse of conduction direction), through the lamp 12, through the first heating coil 36, and finally back to the source through the first terminal 14. In this case, too, so little current flows through the lamp 12, that it is not visibly illuminated. Thus, it is seen that the first heating coil 36 will be continuously heated by current flow through the lamp control arrangement 10, while the second heating coil 38 will also be heated, but to a lesser extent than the first coil 36, since a small portion of the current by-passes this second coil 38 (through the diode 18) part of the time.

After a short while, the first bi-metallic element 20 is heated by the first heating coil 36 by an amount sufficient to effect a closing of the first set of contacts 28 and 30. Electric current now by-passes the first heating coil 36 since there is now no appreciable voltage drop across this coil. Current now flows through the first bi-metallic element 20, then through the lamp 12, and on every other half cycle flows through the half-wave rectifier 18, energizing it during that half cycle, and flows through the second coil 38 through the other half cycles of alternating current flow. Thus, during the closing of the first set of contacts 28 and 30, the lamp 12 is energized to glow at approximately half of its normal, full brilliance value.

Finally, the second heating coil 38 heats the second bi-metallic element 22 by an amount sufficient to effect a closing of the second set of contacts 32 and 34. When the second set of contacts closes, electric current by-passes both heating coils 36 and 38 and the half-wave rectifier 18, and energizes the electric lamp 12 to its full brilliance value. A short while later, one or the other of the two bi-metallic elements 20 or 22 cools (the particular bi-metallic element involved depends upon the thermal time constant of the element and the time of cessation of current flow to its associated heating coil). The cooling of the bi-metallic element breaks the circuit of its associated contacts. Thus, the first bi-metallic element 20 may break the circuit between its contacts 28 and 30. In such a case the lamp abruptly changes from full brilliancy or full tone illumination to an off condition since no appreciable current flows to the lamp 12 through the first heating coil 36. Alternatively, if instead of the first bi-metallic element 20 cooling first, the second bi-metallic element is the first to cool, the second set of contacts 32 and 34 are broken while the first set of contacts are still preserving the electrical circuit through them. In such a case the breaking of the second set of contacts allows the energization of the lamp 12 only during every other half cycle of alternating current flow. Consequently, the brilliancy of the lamp 12 abruptly changes from full tone to half tone. A short while later the second bi-metallic element 22 may open, in which case the lamp 12 suddenly changes its illumination condition from half tone to off, or the second bi-metallic element 22 may remain closed while the first bi-metallic element 20 may be heated sufficiently to again close its circuit between its set of contacts 28 and 30. In the latter case, the illumination level of the lamp 12 abruptly changes from half tone to full tone. From the foregoing it is seen that the illumination condition of lamp 12 is automatically changed to provide three different kinds of illumination level change, namely, between off and full tone illuminating conditions, between full tone and half tone illuminating conditions, and between half tone and off illuminating conditions. (Since each of the aforementioned three different kinds of illumination level change can occur in two different ways, for example from full tone to half tone or from half tone to full tone, six different changes in illumination level are provided.)

One device incorporating the circuit of FIGURE 1 is illustrated in FIGURE 2. In the latter figure the pulsating current source terminals 14 and 16 take the form of a pair of male receptacle members of the type insertable into a standard female type wall receptacle. The incandescent lamp circuit to be controlled in energization level is receivable by the device by means of a pair of female terminals 40 and 42. A male plug 44, having male terminals 46 and 48, is illustrated in phantom in this figure. The plug 44 is of the type adapted for use in readily connecting an incandescent lamp into and out of a standard wall type energization circuit.

In the device of FIGURE 2 the male terminals 14 and 16 are fixed in position on the device, and the bi-metallic elements are anchored at respective end portions 24 and 26 at the terminals 14 and 16. The other end portions of the bi-metallic elements 20 and 22 are substantially unsupported at those ends, and are free to move in directions indicated by the double headed arrows adjacent to each bi-metallic element free end portion. This construction allows the device of the invention to be used in connection with a standard residence type wall receptable to, for example, connect the device between the plug 44 of a Christmas tree lamp array and a wall receptacle.

Figure 3:
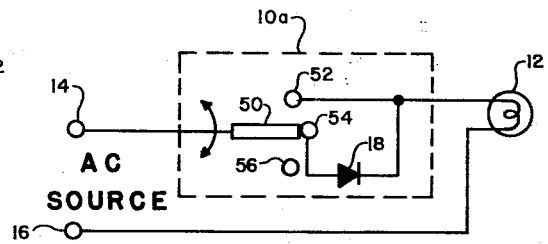
FIGURE 3 is a schematic illustration of another embodiment of the invention depicted in FIGURES 1 and 2.

FIGURE 3 illustrates an alternate form of the arrangement depicted in FIGURES 1 and 2. The lamp control arrangement 10a of FIGURE 3 includes a bi-metallic element 50 that is movable at a free end (the end adjacent to contact 54) in the directions indicated generally by the double headed arrow of this figure. In this arrangement the bi-metallic element 50 has a cool position (not shown) with its free end at rest against a first contact 52. Current flow through the bi-metallic element 50, and through the lamp 12 to be energized gives rise to a heating of the bi-metallic element causing it to move in a direction downwardly of the drawing. After the element moves downwardly to a small extent, it breaks the electrical connection with the first contact 52 and engages connection with the second contact 54. Electrical connection with second contact 54 allows current to flow to the lamp 12 through the rectifier 18, effecting a half-tone illumination of the lamp 12. In this second position, the position illustrated in FIGURE 3, current flow through the bi-metallic element 50 continues to heat it until it breaks electrical connection with the second contact 54 and moves downwardly further until it engages a third contact 56 or stop. In this latter position no current flows through the bi-metallic element, and the lamp is in an unilluminated or off condition, and the bi-metallic element 50 commences to cool. After cooling to a certain extent, the bi-metallic element 50 starts to assume its initial position, and successively makes electrical contact with the second contact 54 and finally with the first contact 52 against which it comes to rest. The bi-metallic element 50 thereupon commences to heat, repeating the cycle. Consequently, in the arrangement of FIGURE 3, the flashing cycle of the lamp 12 is full-tone, half-tone, off, half-tone, full-tone, etc.

While the automatic flashing arrangement of the invention has been described with respect to different combinations of off, half-tone, and full-tone illumination, it is appreciated that the illumination level change flashing can be provided between half-tone and full-tone levels only. Such an arrangement is desirable in environments where it is desirable to have some light on all of the time. This may be provided by using the arrangement of FIGURE 1, but dispensing with the first coil 36 and with the first bi-metallic element 20 and the contacts 28 and 30, and directly connecting the first terminal 14 to the lamp 12.

In the arrangements of FIGURES 1 and 2 the illumination cycle of the lamp 12 is such that, on the average, the lamp is off for approximately 50% of the time, is illuminated at half-tone brilliancy for about 25% of the time, and is illuminated at full brilliancy for the remaining 25% of the time. If it is desired to increase the proportion of time that the lamp is illuminated, a second half-wave rectifier (not shown) may be connected in parallel with the first heating coil 36 to bridge the coil. This second rectifier is connected "back to back" with respect to the first rectifier 18 so that the first rectifier 18 is connected to oppose current flow during one half of each alternating current cycle and the other rectifier (not shown) is connected to oppose current flow during the other half cycle of alternating current flow. In such an arrangement no appreciable current flows to the lamp 12 when both bi-metallic elements 20 and 22 are open, but the lamp glows at half-tone illumination level when either of the two bi-metallic elements are closed and the other element is open, and glows at full-tone brilliancy when both bi-metallic elements are closed.

Figure 4A:
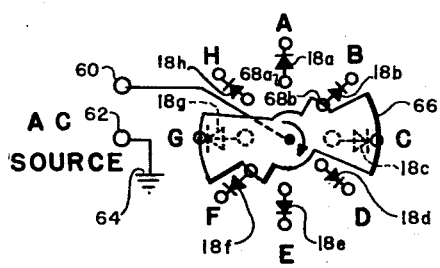
FIGURES 4A and 4B provide a schematic illustration of an automatic and periodic incandescent lamp display arrangement for controlling a plurality of lamps to provide a flashing light pattern.
Figure 4B:
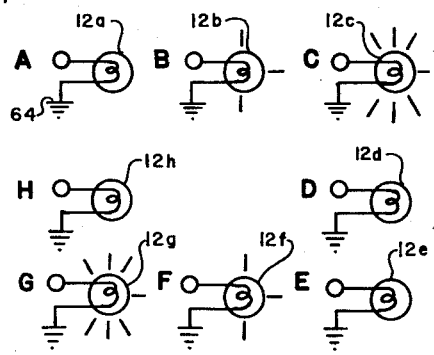

FIGURES 4A and 4B depict yet another light display control arrangement according to the invention. FIGURES 4A and 4B represent, respectively, a control arrangement and an arrangement of lamps to be controlled thereby. Referring first to FIGURE 4B, there is illustrated a group of eight incandescent lamps 12a thru 12h, whose changes in illumination level are to be programmed or controlled to simulate a clockwise (with respect to the drawing) movement of markedly different lights. The display of FIGURE 4B is to be energized such that a simulation is given of a high brilliancy light traveling clockwise around the display followed by a low brilliancy light traveling the same path. Thus, at any given instant of time certain lamps, for example lamps 12a, 12d, 12e, and 12h will be dark, other lamps 12c and 12g will glow at a full-tone illumination level, while other lamps 12b and 12f will glow at a markedly lesser or half-tone illumination level. At a succeeding instant of time the lamp conditions are to be moved to a succeeding clockwise position.

FIGURE 4A illustrates a control circuit for performing the aforementioned light control. Electric current from an alternating current source is fed to the arrangements through a pair of terminals 60 and 62. One terminal 62 is connected directly to ground 64, as is one side of each of the lamps 12a thru 12h (FIGURE 4B) to be illuminated. The other terminal 60 is electrically connected to a rotor 66 which is connected to a motor (not shown) for movement in a clockwise direction with respect to the drawing. The rotor 66 has a configuration such that it makes electrical contact with the various terminals A through H and 68a, 68b, and so on; for providing a selection of the lamps 12a thru 12h (FIGURE 4B) to be energized. The control arrangement of FIGURE 4A includes a number of half-wave rectifiers 18a thru 18h, one rectifier for each of the lamps 12a thru 12h. When the rotor 66 is positioned to make electrical contact with any of the outer terminals designated A through H in FIGURE 4A, direct contact is made between the rotor 66 and the corresponding lamp terminal A through H of FIGURE 4B. In this latter case, the lamp so energized is energized with full alternating current from the alternating current source. However, when the rotor 66 makes electrical contact with an inner terminal (68b, for example), and alternating current flow must pass through a rectifier 18b before reaching the outer terminal B, the corresponding lamp 12b is energized with pulsating direct current. Consequently, that lamp 12b now glows at a half-tone illumination level. Of course, when the rotor 66 is in a position such that no electrical contact is made with any of the terminals associated with an incandescent lamp, for example in the position shown in FIGURE 4A where no electrical connection is made with either terminal 66a or terminal A, the corresponding lamp (12a, in FIGURE 4B) remains dark.

For convenience of explanation, a number of rectifiers 18a to 18h are illustrated as used for the lamps 12a to 12h, one rectifier per lamp. It will be appreciated that a single rectifier (not shown) may instead be used. In such a case the single rectifier would be mounted (for example on a separate rotor similar to rotor 66) so that all terminals that are to be energized at half power are energized by this separate rotor, full brilliancy energization being made by direct connection with the original rotor 66.

While the arrangements of FIGURES 4A and 4B disclose a perimeter type light display arrangement, it will be appreciated that any other light display pattern can be provided by the use of the arrangement of the invention. Thus, for example, a large number of incandescent lamps may be selectively energized at full or half-tone levels to provide an image (as by a punched tape program, with contacts to be energized being contacted by fingers through punched portions of the tape), with the image having half-tone portions corresponding to the lamps energized by a half-wave rectifier, and full-tone portions provided by the lamps that are directly energized by the alternating current. A change in the energization level of the various lamps can be continuously provided to provide a resultant display of a moving image.

What is claimed is:
1. An incandescent lamp flashing arrangement, comprising: a current responsive element connected to be energized to produce a change in shape in response to the flow of a predetermined current therethrough; half-wave rectification means; circuit input means for the arrangement; and incandescent lamp circuit output means for the arrangement; said element being oriented with respect to said rectification means and to said input and output means to provide a direct connection between said input and output means during one time interval, to connect said rectification means in a series circuit between said input and output means during a different time interval, and to completely break the circuit between said input and output means during a still different time interval.

2. An incandescent lamp half-tone flashing arrangement, comprising: an elongated bimetallic element; half-wave rectification means; circuit input means for the arrangement; and incandescent lamp circuit output means for the arrangement; said element being connectable to said rectification means and to said input and output means to periodically provide a direct connection between said input and output means during one time interval, to connect said rectification means in a series circuit between said input and output means during a later time interval, and to completely break the circuit between said input and output means during a still later time interval.

3. In combination: an incandescent lamp connected to be energized from an alternating current source; first periodic switching means having two operating positions and connected to said source and lamp to periodically pass current from said source to said lamp during a first of the operating positions of said switching means and to interrupt substantially all current flow between said source and lamp during a successive operating position of said switching means; half-wave rectification means; and second switching means having two operating positions and connected, during operation of said first periodic switching means in said first operating position thereof, to pass current from said source to said lamp through said rectification means during a first of the operating conditions of said second periodic switching means, thereby to provide half-tone lamp illumination, and to by-pass current flow around said rectification means and between said source and lamp during a second of the operating conditions of said second periodic switching means, thereby to provide full-tone lamp illumination.

4. In combination: an alternating current input circuit, a lamp display output circuit, said input circuit being adapted to be connected to an alternating current source, and said output circuit being adapted to be connected to an incandescent lamp for energization of said lamp; first periodic switching means having two operating positions and electrically connected between said input and output circuits to periodically, under the influence of current flow between said circuits, pass current from said input circuit to said output circuit during a first of the operating positions of said switching means and to interrupt substantially all current flow between said input and output circuits during a successive operating position of said switching means; half-wave rectification means; and second periodic switching means having two operating positions and connected between said input and output circuits, to, during operation of said first periodic switching means in said first operating position thereof, and under the influence of current flow between said input and output circuits, pass current from said input circuit to said output circuit through said rectification means during a first of the operating conditions of said second periodic switching means, thereby to provide half-tone lamp illumination, and by-pass current flow around said rectification means and between said input and output circuits during a second of the operating conditions of said second periodic switching means, thereby to provide full-tone lamp illumination.

5. Incandescent lamp display control arrangement, comprising: an input circuit adapted to be connected to an alternating current source; an output circuit adapted to be connected to an incandescent lamp; a half-wave rectifier; and aperiodic switching means; said switching means being connected to periodically connect said input circuit directly to said output circuit through said rectifier during a different time interval, and completely break the electrical path between said input and output circuits during a still different time interval.

6. Method of automatically providing a plurality of uniquely different changes in illumination level of an incandescent lamp, comprising the steps of: connecting an incandescent lamp to an alternating current source, and then aperiodically interrupting all current flow to the lamp during one time interval, interrupting alternate half-cycles of alternating current flow to the lamp during another time interval, and passing alternating current directly to the lamp during yet another time interval; whereby the lamp is aperiodically energized to display a number of markedly different changes in illumination level.

7. A method of subjecting an incandescent lamp to automatic energization control to display a number of markedly different illumination levels, comprising the steps of: connecting the lamp to be controlled to an alternating current source; and then interrupting the flow of current to the lamp under thermostatic control to pass a full flow of alternating current to the lamp during one portion of a periodic cycle, passing half-wave current to the lamp during another portion of the periodic cycle, and interrupting the entire flow of electric current to the lamp during yet another portion of the periodic cycle.

8. Incandescent lamp multi-level flashing apparatus comprising, in combination: two prong-like male terminals adapted to be inserted into a receptacle for the receipt of alternating current therefrom; two female terminals of the kind receptive of prong-like terminals for providing a means for passing the electrical output from the apparatus to a pronged output circuit connector; a first heating coil electrically connected between one of said male terminals and one of said female terminals; a second heating coil electrically connected between the other of said male terminals and the other of said female terminals; a first bi-metallic switch mounted in heat receiving relationship with respect to said first heating coil and connected to provide a direct connection between the first of said male terminals and the first of said female terminals in response to the receipt of heat from said first heating coil; a second bi-metallic switch mounted in heat receiving relationship with respect to said second heating coil and connected to provide a direct connection between the second of said male terminals and the second of said female terminals in response to the receipt of heat from said second heating coil; and a half wave rectifier electrically connected between said first male terminal and said first female terminal; whereby said apparatus is adapted to be connected between a source of alternating current and an incandescent lamp and to supply to the lamp alternating current at one time interval, direct current at another time interval, and no current during a third time interval, for providing multi-tone flashing of the lamp.

9. An incandescent lamp half-tone flashing arrangement, comprising: a bi-metallic element circuit control means; half-wave rectification means; circuit input means for the arrangement; an incandescent lamp circuit output means for the arrangement; said element circuit control means being connectable to said rectification means and to said input and output means to periodically provide a direct connection between said input and output means during one time interval, to connect said rectification means in a series circuit between said input and output means during a later time interval, and to completely break the circuit between said input and output means during a still later time interval.

10. An incandescent lamp flashing arrangement, comprising: a current responsive element connected to be energized to produce a change in shape in response to the flow of a predetermined current therethrough; half-wave rectification means; circuit input means for the arrangement; and incandescent lamp circuit output means for the arrangement; said element being oriented with respect to said rectification means and to said input and output means to provide a direct connection between said input and output means during one time interval, to connect said rectification means in a series circuit between said input and output means during a different time interval, and to completely break the circuit between said input and output means during a still different time interval, said current responsive element comprising an elongated bimetallic element fixed in position at one end thereof, and movable at the other end thereof in response to current flow therethrough.

11. The arrangement claimed in claim 10, wherein said rectification means comprises a half-wave rectifier and said current responsive element includes a heating member electrically connected in parallel with said rectifier.

12. An incandescent lamp flashing device, comprising: a device housing member; a bimetallic current responsive element moveably mounted on said member and connected to be energized to move in response to the flow of a predetermined current therethrough; half-wave rectification means; circuit input means for the device; and incandescent lamp circuit output means for the device; said element being oriented with respect to said rectification means and to said input and output means to provide a direct connection between said input and output means during one time interval and to connect said rectification means in a series circuit between said input and output means during a different time interval.

13. An incandescent lamp half-tone flashing arrangement, comprising: a lamp control output circuit; an elongated bimetallic element mounted for movement into and out of electrical series with said output circuit; half-wave rectification means connected to be in electrical parallel with said bimetallic element during the time that said element provides the series connection with said output circuit; and an input circuit for the arrangement; said element being connectable to said rectification means and to said input and output circuits to periodically provide a direct connection between said input and output circuits during one time interval and to connect said rectifier means in a series circuit between said input and output circuits during a later time interval.

References Cited in the file of this patent
UNITED STATES PATENTS

| | | |
|---|---|---|
| 2,235,360 | Davis | Mar. 18, 1941 |
| 2,896,125 | Morton | July 21, 1959 |
| 2,981,866 | Tsien et al. | Apr. 25, 1961 |